US009185192B2

(12) United States Patent
Lee (10) Patent No.: US 9,185,192 B2
(45) Date of Patent: Nov. 10, 2015

(54) METHOD AND SYSTEM OF POWER SAVING AND PORTABLE DEVICE USING THE SAME

(75) Inventor: Kwang Min Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 664 days.

(21) Appl. No.: 12/873,545

(22) Filed: Sep. 1, 2010

(65) Prior Publication Data

US 2011/0077012 A1    Mar. 31, 2011

(30) Foreign Application Priority Data

Sep. 28, 2009   (KR) .................. 10-2009-0091724

(51) Int. Cl.
| | |
|---|---|
| *H04W 4/00* | (2009.01) |
| *H04M 1/00* | (2006.01) |
| *H04M 1/725* | (2006.01) |
| *H04W 52/02* | (2009.01) |
| *H04W 76/02* | (2009.01) |
| *H04W 88/06* | (2009.01) |

(52) U.S. Cl.
CPC .............. *H04M 1/006* (2013.01); *H04M 1/725* (2013.01); *H04M 1/72502* (2013.01); *H04W 52/0274* (2013.01); *H04M 2250/08* (2013.01); *H04W 76/02* (2013.01); *H04W 88/06* (2013.01); *Y02B 60/50* (2013.01)

(58) Field of Classification Search
CPC ... H04W 84/045; H04W 88/06; H04W 92/02; H04W 4/04; H04W 76/06; H04W 36/14; H04W 88/10; H04W 76/02; H04W 88/02; H04L 65/1069; H04L 12/5692; H04M 7/0057; H04M 3/465; H04M 1/725; H04M 2207/18; H04M 1/72502; H04M 2250/08; H04M 1/72505; H04M 1/006; H04M 1/72513; H04M 2242/30; H04M 3/54
USPC ................................ 455/445, 462, 465, 552.1
See application file for complete search history.

(56) References Cited

U.S. PATENT DOCUMENTS

| | | | | |
|---|---|---|---|---|
| 5,260,988 | A | * | 11/1993 | Schellinger et al. ........ 455/552.1 |
| 5,920,815 | A | * | 7/1999 | Akhavan .................... 455/426.1 |
| 6,122,515 | A | * | 9/2000 | Ito et al. ........................ 455/450 |
| 6,253,088 | B1 | * | 6/2001 | Wenk et al. ................... 455/462 |
| 6,321,096 | B2 | * | 11/2001 | Lautenschlager et al. ..... 455/461 |
| 6,600,925 | B1 | * | 7/2003 | Rams ............................ 455/445 |
| 7,174,187 | B1 | * | 2/2007 | Ngan .......................... 455/552.1 |
| 2002/0049073 | A1 | * | 4/2002 | Bell ............................... 455/552 |
| 2003/0050090 | A1 | * | 3/2003 | Raffel et al. .................. 455/552 |

(Continued)

FOREIGN PATENT DOCUMENTS

| | | | | |
|---|---|---|---|---|
| KR | 10-0244851 | | 11/1999 | ............... H04B 7/26 |
| KR | 2002-8310 | | 1/2002 | ............... H04B 7/26 |

(Continued)

*Primary Examiner* — Allahyar Kasraian
(74) *Attorney, Agent, or Firm* — Cha & Reiter, LLC.

(57) ABSTRACT

Provided is a method for saving power of a portable device that exists in a location where a fixed telephone network is available, the method including transferring a mobile communication network-based call connection request message transmitted to the portable device into a fixed telephone network-based call connection request message; and receiving the transferred call connection request message in a fixed telephone network support communication module included in the portable device, and forming a fixed telephone network-based call channel in place of the mobile communication network based call.

17 Claims, 5 Drawing Sheets

(56) References Cited

U.S. PATENT DOCUMENTS

| | | | |
|---|---|---|---|
| 2004/0229634 A1* | 11/2004 | Bushnell et al. | 455/461 |
| 2004/0235500 A1* | 11/2004 | Dombkowski et al. | 455/461 |
| 2005/0148353 A1* | 7/2005 | Hicks et al. | 455/466 |
| 2006/0019667 A1* | 1/2006 | Hicks, III | 455/445 |
| 2006/0223511 A1* | 10/2006 | Hagale et al. | 455/417 |
| 2007/0225034 A1* | 9/2007 | Schmidt | 455/552.1 |
| 2013/0225143 A1* | 8/2013 | Emerson et al. | 455/417 |

FOREIGN PATENT DOCUMENTS

| | | |
|---|---|---|
| KR | 10-2006-0092701 A | 8/2006 |
| KR | 10-2009-0070437 A | 7/2009 |

\* cited by examiner

METHOD AND SYSTEM OF POWER SAVING AND PORTABLE DEVICE USING THE SAME

CLAIM OF PRIORITY

This application claims priority to, and the benefit of the earlier filing data, pursuant to 35 USC 119, to that patent application filed in the Korean Patent Office on Sep. 28, 2009, entitled Method And System of Power Saving And Portable Device Using the Same," and afforded serial number 10-2009-0091724, the entire contents of which is incorporated by reference, herein.

BACKGROUND OF THE INVENTION

1. Field of the Invention

The present invention relates to the field of portable devices, and more particularly, to a method and a system for saving power of a portable device using both a mobile communication network and a fixed telephone network.

2. Description of the Related Art

Portable devices have rapidly developed from their operation using simple functions such as voice call and short message, to more complex functions, such as video telephony, e-book function, and Internet function. Recently, portable devices have been equipped with digital camera functions that capture both still and moving images. Accordingly, the portable device can easily photograph desired moving pictures or still images that may be stored and displayed at a latter time. In addition, the still or moving images may be provided to other users using an image transmission function. However, a communication which is considered to be most familiar with the general public in the daily life may be a regular landline phone using a fixed telephone network. The landline phones have also been developed to provide, a cordless phone function, wherein the handset may be wirelessly connected to a residential base station. Additionally, the cordless phone function is used for business use, for example, representatively, a Digital European Cordless Telephone (DECT) system. The DECT system is selected as European Standards by European Standards Organization, i.e., European Telecommunications Standards Institute (ETSI). Portable devices which can use the mobile communication network and the fixed telephone network have been developed, respectively. Recently, such portable devices may operate as a complex cordless device that can use both the mobile communication network and the fixed telephone network. However, in case of the complex cordless device, it is disadvantageous in that the standby mode for mobile communication network and fixed telephone network requires large power consumption.

SUMMARY OF THE INVENTION

The present invention has been made in view of the above problems, and provides a method and a system for saving the power of a portable device using both a mobile communication network and a fixed telephone network.

In accordance with an aspect of the present invention, a method of saving power of a portable device which exists in a location where a fixed telephone network is available, includes: transferring a mobile communications network-based call connection request message to be transmitted to the portable device into a fixed telephone network-based call connection request message; and receiving the transferred call connection request message in a fixed telephone network support communications module included in the portable device, forming a fixed telephone network-based call channel.

In accordance with another aspect of the present invention, a system of saving a power includes: a mobile communications system that constitutes a mobile communications network sending a mobile communications network-based call connection request message, which is to be transmitted to a portable device, to a fixed telephone network, when a communication is possible to the portable device based on the fixed telephone network; a fixed telephone system which constitutes a fixed telephone network sending the call connection request message sent from the mobile communication system to a fixed telephone network available telephone number of the portable device; and a portable device which includes both a communications module capable of communicating with the mobile communication network and a communication module capable of communicating with the fixed telephone network, receives the mobile communications network-based call connection request message through the fixed telephone network when a communication is possible based on the fixed telephone network.

In accordance with another aspect of the present invention, a portable device includes: a mobile communication network support communication module performing a mobile communication network-based communication; a fixed telephone network support communication module performing a fixed telephone network-based communication; a control module controlling transmission of a message requesting a transfer to a fixed telephone network from a mobile communications network for the fixed telephone network-based call connection, when a call connection request message is received in the mobile communication network support communications module, in case a communication is possible based on the fixed telephone network.

In accordance with another aspect of the invention, a portable terminal is disclosed which comprises a mobile communication module supporting communication with a mobile communication network; a fixed network communication module supporting communication with a fixed network communication network; a processor in communication with a memory, the memory including code, which when accessed by the processor causes the processor to: receive a call request message from the mobile communication module; determine a position of the terminal with regard to a coverage area of the fixed network communication network; transfer the call request message to the fixed network communication network to establish a fixed network communication link in response to the call request message, when the position of the terminal is within the coverage area of the fixed network communication network.

According to a method and a system for saving power of portable device using both a mobile communication network and a fixed telephone network, and a portable device using the same, power can be saved by supporting a call based on a fixed telephone network which requires a relatively small power consumption.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Hereinafter, it is illustrated that a device for the present invention is a portable device, but it is not limited to this. That is, a device according to an exemplary embodiment of the present invention is a device which is implemented in such a manner that communication with mobile communication network and fixed telephone network are possible, and can be applied to all kinds of information telecommunication devices and multimedia devices and applications thereof, such as a mobile communication device, a cellular phone, a personal digital assistant (PDA), and a smart phone and other similar type of devices that provide for communication with a wireless network (e.g., mp3-player with wireless capability).

Figure 1:
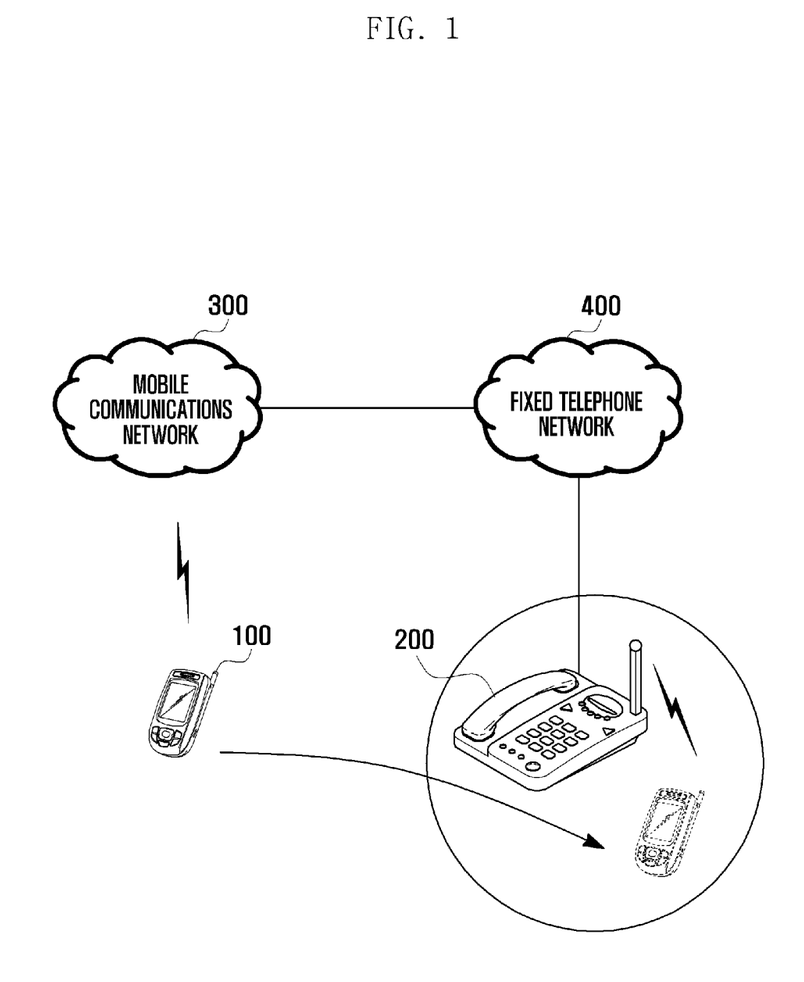
FIG. 1 is a block diagram illustrating a configuration of a complex wire-wireless communication system according to an exemplary embodiment of the present invention.

FIG. 1 is a block diagram illustrating a configuration of a complex wire-wireless communication system according to an exemplary embodiment of the present invention.

Referring to FIG. 1, a complex communications support system of the present invention includes a portable device 100, a wire gateway 200, a mobile communications network 300, and a fixed telephone network 400. The mobile communications network 300 is formed of a mobile communication system, and the fixed telephone network 400 can be formed of a fixed telephone system.

The complex communication support system of the present invention may include such a elements that support the portable device 100 to access the mobile communications network 300 and be provided access to the mobile communication service when the portable device 100 deviates from the coverage of the wire gateway 200.

Particularly, when the portable device 100 is positioned in the coverage of the wire gateway 200, (as may be determined by the location of the portable terminal, or a received signal strength from the gateway 200), the complex communication support system of the present invention enters a standby mode so that both the mobile communications network 300 and the fixed telephone network 400 may be used. In addition, the communication support system may support the portable device 100 to perform a call connection based on the fixed telephone network 400 after the conversion of the call request message into the fixed telephone network 400 when the call connection is requested through the mobile communications network 300. Accordingly, in the complex communications support system of the present invention, when the portable device 100 exists in the coverage of the wire gateway 200, a communication module that has a relatively small power consumption is utilized so that the power consumption of the portable terminal can be reduced. Hereinafter, each element of the portable device is described in such detail that one skilled in the art would understand and appreciate the operation of the invention claimed.

The mobile communication network 300 is a network providing a mobile communication service with the portable device 100 and is formed based on various well-known (GSM, CMDA) mobile communication system configurations. For example, the mobile communications network 300 may include a base station, a base station controller, a mobile switching center, and a home location register (which are not shown. However, such elements are well-known in the field of mobile communication networks and knowledge of the operation of such elements would be known to those skilled in the art).

The mobile communication network 300 can support a signal transfer with the portable device 100 from the base station, perform a call setting operation with the portable device 100 based on the base station controller, and operate to form a call channel with the base station in response to the call request. The call that the base station controller sends can be switched by the mobile switching center. Accordingly, the portable device 100 can form a call channel with another portable device or a fixed telephone (not shown).

The base station controller of the mobile communications network 300 can inquire of the fixed telephone network 400 whether the communication with the portable device 100 is possible based on the fixed telephone network 400 during the call setting operation. That is, the base station controller of the mobile communication network 300 can check whether the portable device 100 can operated as a wired or a wireless device through the fixed telephone network 400. To do this, the portable device 100 should join a specific service in order to use a call service based on the fixed telephone network 400. Furthermore, the portable device 100 can provide information to the communication system so that a service provider supporting a corresponding service in the subscription of specific service may support a relating service with the mobile communication network 300.

In the meantime, the portable device 100 can be provided with a communication connection service based on the fixed telephone network 400 according to the subscription service type when the service provider supports both the mobile communication network 300 and the fixed telephone network 400. Further, it can be supported by a wired and wireless communications service through a coalition between service providers when each service provider of the fixed telephone network 400 and the mobile communication network 300 is different.

Furthermore, the portable device 100 of the present invention supports a communication module for the mobile communication network 300 and a communication module for the fixed telephone network 400 to simultaneously enter a standby mode in case of entering the coverage of the wire gateway 200. In this case, the mobile communications network 300 can control the call connection or the call transmission according to the location of the portable device 100 for saving the power of the portable device 100.

In more detail, the portable device 100 can perform registration for the usage of a fixed telephone network 400 in the wire gateway 200 in case of entering into the coverage of the fixed telephone network 400. At this time, the system of the fixed telephone network 400 can share the registration information of the portable device 100 with the mobile communication system through the mobile communications network 300, or can perform a response for an inquiry when an inquiry about the registration information acknowledgement request is generated from the system configuration of the mobile communications network 300.

Accordingly, when the mobile communication network 300 receives a request message for the call connection from the portable device 100, the portable device 100 can inquire of the shared registration information of the fixed telephone system whether the portable device 100 is registered in the fixed telephone network 400. Thereafter, when the portable device 100 is registered in the fixed telephone network 400, the mobile communication network 300 can send the call connection request message to the fixed telephone network 400 and support the call connection through the fixed telephone network 400.

Moreover, the mobile communications network 300 can send a call connection message to the portable device 100, perform the call transmission in response to a corresponding message in case of receiving a message requesting a call transfer from the portable device 100. The fixed telephone network 400 is a network for configuring of the fixed telephone system to be capable of providing a wire-based call service to the portable device 100. The fixed telephone network 400 may include a wired and wireless service controller so as to support the call service connection using the mobile communications network 300 of the portable device 100.

The wired and wireless service controller is a configuration that manages the registration information of the portable device 100 so as to provide the mobile communication service and wired communication service of the portable device 100 between the mobile communications network 300 and the fixed telephone network 400. In the description of the present invention, it is illustrated that this wired and wireless service controller is included in the fixed telephone network 400, but the wired and wireless service controller can be designed independently with the fixed telephone network 400, and can be positioned between the mobile communication network 300 and the fixed telephone network 400.

In the meantime, the fixed telephone network 400 can manage the registration information regarding the portable device 100, send the registration information to the mobile communication network 300, or can provide corresponding information when an inquiry is requested from the mobile communication network 300. And, when the portable device 100 deviates from the coverage of the fixed telephone network, the fixed telephone network 400 can store the information of a subscription phone number of the portable device 100 for the mobile communication network 300 in order to support communication with the portable device 100 based on the mobile communication network 300.

Thereafter, in case of receiving a message requesting a call connection to the portable device 100 from another device, the fixed telephone network 400 determines whether the call connection is possible based on a system configuration constituting the fixed telephone network 400. When the call connection through the fixed telephone network 400 is impossible, the system constituting the fixed telephone network 400 can send the call connection request message to the mobile communications network 300. In this case, the subscription phone number of the portable device 100 for the mobile communications network 300 can be sent together.

The mobile communication network 300 can control transmission of a call connection request message to a corresponding telephone number when the network 300 receives the call connection request message and a telephone number from the fixed telephone network 400. To do this, the fixed telephone network 400 can previously obtain the information about the mobile communication network 300 available telephone number of the portable device 100.

The wire gateway 200 is a configuration that can be built in the fixed telephone connected to the fixed telephone network 400, including a wireless circuit unit, a baseband circuit unit, a telephone line connection unit, a control circuit unit, a power circuit unit (not shown). However, such elements are well-known in the art and their detailed description need not be provided herein to appreciate and understand the principles of the invention claimed.

The baseband circuit unit of the wire gateway 200 performs the compression/expansion of voice signals for the wireless transmission, the modulation and demodulation of control signal of the connection sequence with the portable device 100, the synthesis and separation of the voice signal and control signal.

The wireless circuit unit performs the modulation and demodulation of baseband signals into a radio frequency signal, the amplification of the sending/receiving signal at antenna, the oscillation of the carrier frequency, and the signal level detection of other channel frequencies. Moreover, the control circuit performs an overall control operation and includes a call name memory, an identification device, and a carrier sense circuit that are essential as a control apparatus of the radio station facility. The power circuit can make a necessary direct current voltage available to be a common power and perform power backup by using emergency power in a power failure mode. In the present invention, it is illustrated that the complex communication support system prepares the wire gateway 200 and performs the support of a radio telephone call with the portable device 100 by using the wire gateway 200. However, the present invention is not limited to this configuration. That is, the wire gateway 200 can be changed according to the characteristics or operating conditions of the wire communication supporting module included in the portable device 100. For example, the wire gateway 200 can be replaced with a DECT base station when the wire communication supporting module of the portable device 100 is a digital enhanced cordless telecommunication (DECT) module. In this case, the portable device 100 can perform a signal transfer necessary for the call based on the fixed telephone network 400 through the DECT base station.

The portable device 100 can be provided with the wireless telephone service base on the fixed telephone network 400 through the wire gateway 200 or the DECT base station, or can be provided with the mobile communication service through the base station of the mobile communication network 300. This portable device 100 includes both a communication module for the usage of mobile communication network 300 and a communication module for the usage of the fixed telephone network 400, can control two communication modules to simultaneously enter a standby mode according to the coverage, or control only one communication module to enter the standby mode, while activating the other mode.

Particularly, in case of being positioned in a communication region in which the fixed telephone network 400 is available, the portable device 100 of the present invention can operate to send a call transfer request message to the mobile communications network 300 with respect to the call connection request message transmitted based on the mobile communication network 300, and to perform a corresponding call connection based on the fixed telephone network 400. Accordingly, in the region in which the fixed telephone network 400 is available, the portable device 100 of the present invention can use the fixed telephone network 400 based communication module and maintain the communication module for the mobile communication network 300 to be in a low power state so that power consumption can be minimized. Hereinafter, the configuration and function of the portable device 100 is illustrated in detail with reference to the drawings.

Figure 2:
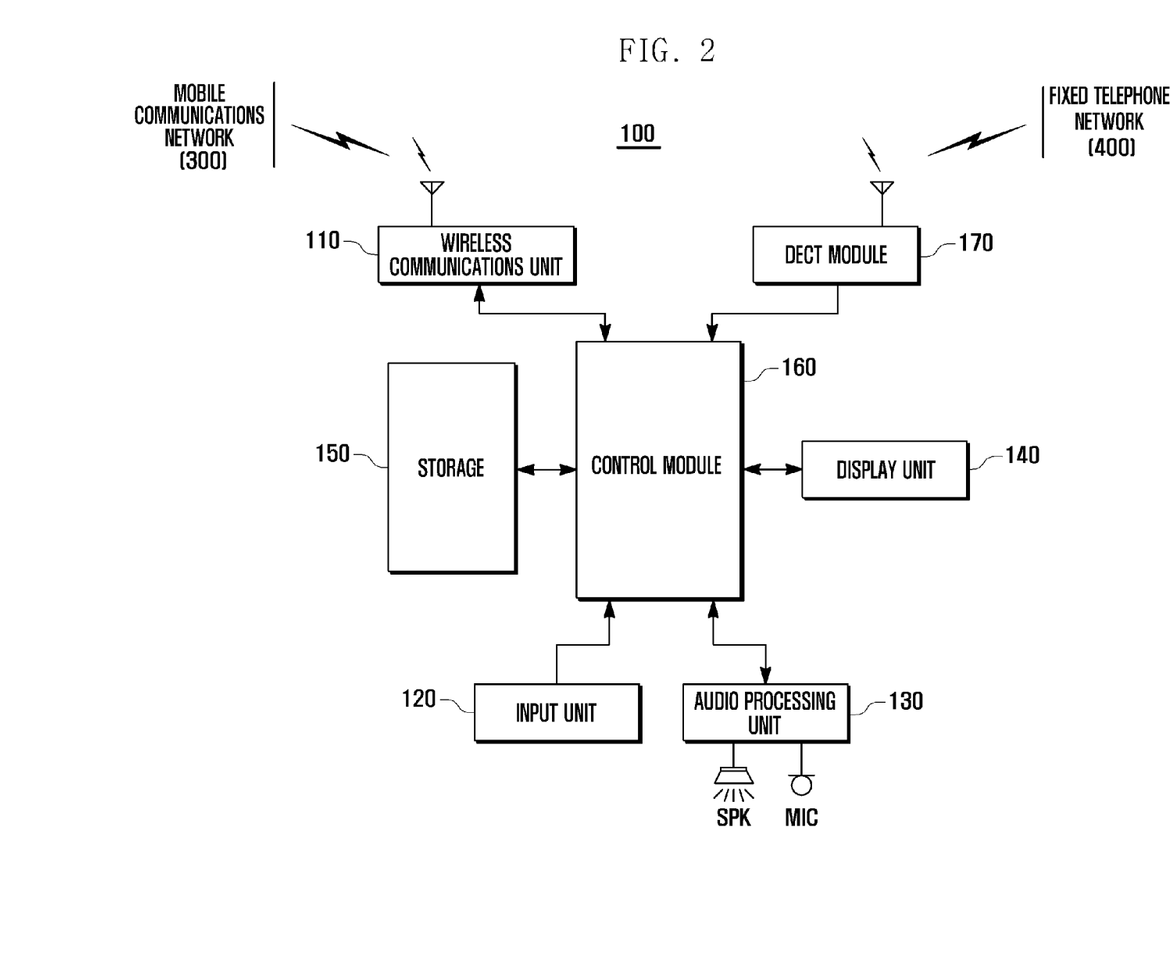
FIG. 2 is a block diagram illustrating a schematic configuration of a portable device according to an exemplary embodiment of the present invention.

FIG. 2 is a block diagram illustrating a schematic configuration of a portable device according to an exemplary embodiment of the present invention.

With reference to FIG. 2, the communication module capable of performing the call connection based on the fixed telephone network 400 is illustrated based on a DECT module. However, the present invention is not limited to this particular configuration, and the fixed telephone network support communication module of the present invention can be one of a variety of other fixed telephone network support communication modules, e.g., CT-1, and CT-2 fixed telephone network support communication module. In the description provided below, the wire gateway 200 is illustrated for the connection of the DECT module 170 and the fixed telephone network 400. As described above, the wire gateway 200 can be replaced with the DECT base station.

Referring to FIG. 2, the portable device 100 of the present invention includes a wireless communication unit 110, an input unit 120, an audio processing unit 130, a display unit 140, a storage unit 150, a control module 160 and a DECT module 170. Here, the wireless communications unit 110 is a mobile communication network support communication module, and the DECT module 170 may correspond to a fixed telephone network support communication module.

The portable device 100 of the present invention having such a configuration can control the wireless communication unit 110 and the DECT module 170 to simultaneously enter a standby mode when it is included in the coverage of the wire gateway 200 and is registered in the fixed telephone network 400 by using the wire gateway 200. If a call connection request message sent through the wireless communication unit 110 is received, the portable device 100 can operate to perform call forwarding by transmitting a call transfer request message as a response message for the call connection request message so as to communicate based on the DECT module 170. Accordingly, the portable device 100 can operate to provide a call service by connecting the call based on the DECT module 170 with respect to the call connection received in the wireless communications unit 110. And, in the case the portable devices deviates (i.e., moves outside the coverage area) from the coverage of the wire gateway 200, the portable device 100 cuts off (or reduces) the power supplied to the DECT module 170, and can maintain a call standby state for only the wireless communication unit 110. Hereinafter, each configuration of the portable device 100 is illustrated in detail.

The wireless communications unit 110 manages the transmission and reception of a signal for the call connection under the control of the control module 160. To do this, the wireless communications unit 110 includes a wireless frequency transmitter (not shown) that up-converts and amplifies the frequency of the transmitted signal, and a wireless frequency reception unit (not shown) that low-noise amplifies the received signal and down-converts the frequency.

Particularly, the wireless communications unit 110 of the present invention can transmit a call transfer request message to the mobile communication network 300 through the base station, when the portable device 100 is positioned in a location where the fixed telephone network 400 is available and receives the call connection request message from the base station constituting the mobile communication network 300 under the control of the control module 160.

At this time, the wireless communications unit 110 can include the information relating to the DECT module 170 for the support of fixed telephone network 400, i.e., the fixed telephone number in the call transfer request message and transmit information regarding the fixed telephone number to the mobile communication network 300. The input unit 120 includes a plurality of input keys and the function keys for receiving an input of number or character information and setting various functions. The function keys can include a direction key, a side key and a shortcut key which are set to perform a specific application.

Moreover, the input unit 120 generates a key signal inputted in connection with user setting(s) and the function control of the portable device 100 and sends it to the control module 160. Particularly, when the input unit 120 receives the call connection request message transmitted to one of the mobile communication network 300 and the fixed telephone network 400, the input unit 120 can generate an input signal for confirming the reception of the message.

The input unit 120 generates various input signals for the setting of complex communication support mode that sets the call connection request message received from the mobile communication network 300 to be sent through the fixed telephone network 400 according to a user's request, can send the signals to the control module 160. The audio processing unit 130 includes a speaker (SPK) for playing audio data transmitted and received in the call, and a microphone (MIC) for collecting the voice or other audio signal of a user in the call.

Particularly, the audio processing unit 130 of the present invention performs an alarm when the call connection request message is received through the mobile communication network 300 according to the setting of complex communication support mode that transfers the call received from the mobile communication network 300 in the fixed telephone network 400 available region, and then, can generate an alarm indicating the reception of call connection request message received, which is transferred through the fixed telephone network 400. In this case, the audio processing unit 130 may not output a separate alarm even if the call connection request message is received through the mobile communication network 300 according to the setting of the portable device 100.

The display unit 140 is an area providing a screen required for the operation of portable device 100. For example, the display unit 140 can output a preset stand-by screen after the completion of a booting (i.e., a startup) operation, a menu screen for the selection of various functions of the portable device, a screen that supports the selection of a submenu of each menu, and a screen according to the selection and the activation of specific menu.

The display unit 140 can be one of a Liquid Crystal Display (LCD) or an Organic Light Emitted Diode (OLED) or other similar type device e.g., LED. When the display unit (referred to hereinafter as LCD) is applied, the display unit 140 can include a control module, a memory that can store data and a display element. When the LCD is implemented with a touch screen capability, the screen of display unit 140 can be operated as an input unit. Such touch screen technology is well-known in the art and need not be discussed in detail herein.

Particularly, the display unit 140 can output an icon or an indicator for indicating the complex communication support mode to one side of the screen, can output an alarm screen corresponding to a call connection request message received through the mobile communication network 300, an alarm screen corresponding to a case of receiving a corresponding call connection request message after transferring to the fixed telephone network 400, and an alarm screen for the call connection request message received through the DECT module 170.

The storage unit 150 stores an application(s) for various user function support of the portable device 100, and a user data as well as an application necessary for the functional operation according to an embodiment of the present invention. Such storage unit 150 can include a program area (not shown) and a data area (not shown). The program area stores an operating system (OS) for booting (i.e., a start-up or initiation operation) the portable device 100, and one or more applications associated with different operations of a user function of the portable device 100, e.g., the audio playing function, an image or moving picture playing function, the file search function, and the image collection function.

Particularly, the program area of the present invention can include a mobile communication application for the support of the mobile communication network 300 based call service, a wire communication application for the support of the fixed telephone network 400 based call service, and a complex communication application for the support of the complex communication support service.

The mobile communication application includes one or more routines that operate to activate the wireless communication unit 110 when power is supplied according to the setting of the portable device 100 and support forming a call channel with the mobile communication network 300 through the wireless communications unit 110.

The wire communication application can include a routine that operates to activate the DECT module 170 when power is supplied according to the setting of the portable device 100, and a routine that supports forming a corresponding call channel in case of receiving the call connection request message based on the wire gateway 200 or the DECT base station.

The wire communication application can include a routine that a user initiates to directly activate the DECT module 170 by using the input unit 120, a routine that activates the DECT module 170 according to a given period and searches whether the DECT base station or the wire gateway 200 exists within a designated area, and a routine that registers previously stored information in the fixed telephone network 400 or the DECT base station through the wire gateway 200 or the DECT base station when the corresponding wire gateway 200 or the DECT base station is detected.

The complex communication application may include a routine that examines whether the portable device 100 activates or inactivates the DECT module 170, and a routine that supports a power saving mode of the present invention when the DECT module 170 is activated to form the associated communication channel through the fixed telephone network 400.

The routine for supporting the power saving mode controls the portable device 100 to transmit the call connection request message, which is sent through the mobile communications network 300, to the fixed telephone network 400 when the DECT module 170 based call connection service is available through the fixed telephone network 400. That is, the routine for supporting the power saving mode operates to examine the reception of the call connection request message through the mobile communications network 300 when the portable device 100 is simultaneously in a standby mode with regard to the mobile communication network 300 and the fixed telephone network 400, and to transmit the call transfer request message including the telephone number that can use the fixed telephone network 400 in the reception of the message to the mobile communication network 300. The mobile communication network 300 can control the transmission of call connection request message through the fixed telephone network 400 based on the received telephone number according to the service support available type of the portable device 100.

Thereafter, the fixed telephone network 400 searches for a portable device 100 that can use the fixed telephone network 400 based on the telephone number received from the mobile communication network 300, and sends the call connection request message to a corresponding portable device 100.

The data area is an area in which data generated according to the use of the portable device 100 is stored, can store information corresponding to an audio data or a video data recorded by the user in the call, and access various user data relating to various optional functions provided by the portable device 100, e.g., information corresponding to a moving picture, a phone book data, an audio data and the corresponding content or user data.

Particularly, the data area can store fixed telephone network 400 registration information and/or mobile communication network 300 registration information. When the portable device 100 is positioned in the location in which the fixed telephone network 400 is available, the fixed telephone network 400 registration information can be transmitted to the wire gateway 200 or the DECT base station according to user's request or under the control of the control module 160. The DECT module 170 is a communication module that supports the portable device 100 to use a call service based on the fixed telephone network 400.

As described above, the DECT module 170 is a communication module that is capable of connecting to the fixed telephone network 400, can have a form capable of supporting the function of the wireless mobile phone through the wire gateway 200 or the DECT base station through a signal transmission/receive (transceiver) operation. When the portable device 100 is positioned in the location in which the fixed telephone network 400 is available, i.e., within the coverage for the DECT base station or the wire gateway 200, the DECT module 170 can be activated, whereas the DECT module 170 can be deactivated in case the portable terminal is outside the area of coverage.

The control module 160 controls the power supply to each element in the illustrative configuration, controls signal flow between each element, and operates to perform various functions of the portable device 100. The control module 160 operates to check the activation of the DECT module 170 in the call service support of the portable device 100, and to connect the call through the fixed telephone network 400 when the call connection request message is received through the wireless communications unit 110.

In more detail, when the control module 160 receives the call connection request message through the wireless communications unit 110, the control module 160 checks the fixed telephone network 400 registration information stored in the storage 150. And the control module 160 includes the registration information into the call transfer request message and sends it to the mobile communications network 300.

Thereafter, the control module 160 controls the forming of a call channel based on the DECT module 170 with respect to the call connection request message received through the fixed telephone network 400. In this case, the control module 160 operates the wireless communications unit 110 only as a call reception standby state and does not perform the call connection, so that the low power supply state of the wireless communications unit 110 is maintained. Accordingly, the power consumption through the wireless communications unit 110 can be minimized. The control module 160 can minimize the power used for the call connection by using the DECT module 170 which has a relatively small power consumption for the call connection.

As described above, in the method and system for saving a power according to an exemplary embodiment of the present invention, when the portable device 100 can use the fixed telephone network 400, the call connection request message requesting the call connection through the mobile communications network 300 is transferred into the fixed telephone network 400, so that the fixed telephone connection is supported based on the DECT module 170 which has a relatively small power consumption. Accordingly, the method and the system and the portable device of the present invention can optimize the power save of the portable device.

Until now, the configuration, the function and the role of configuration of the power saving system and the portable device according to an exemplary embodiment of the present invention was illustrated. Hereinafter, the above-described power saving system and the operation of portable device will be illustrated with reference to drawing.

Figure 3:
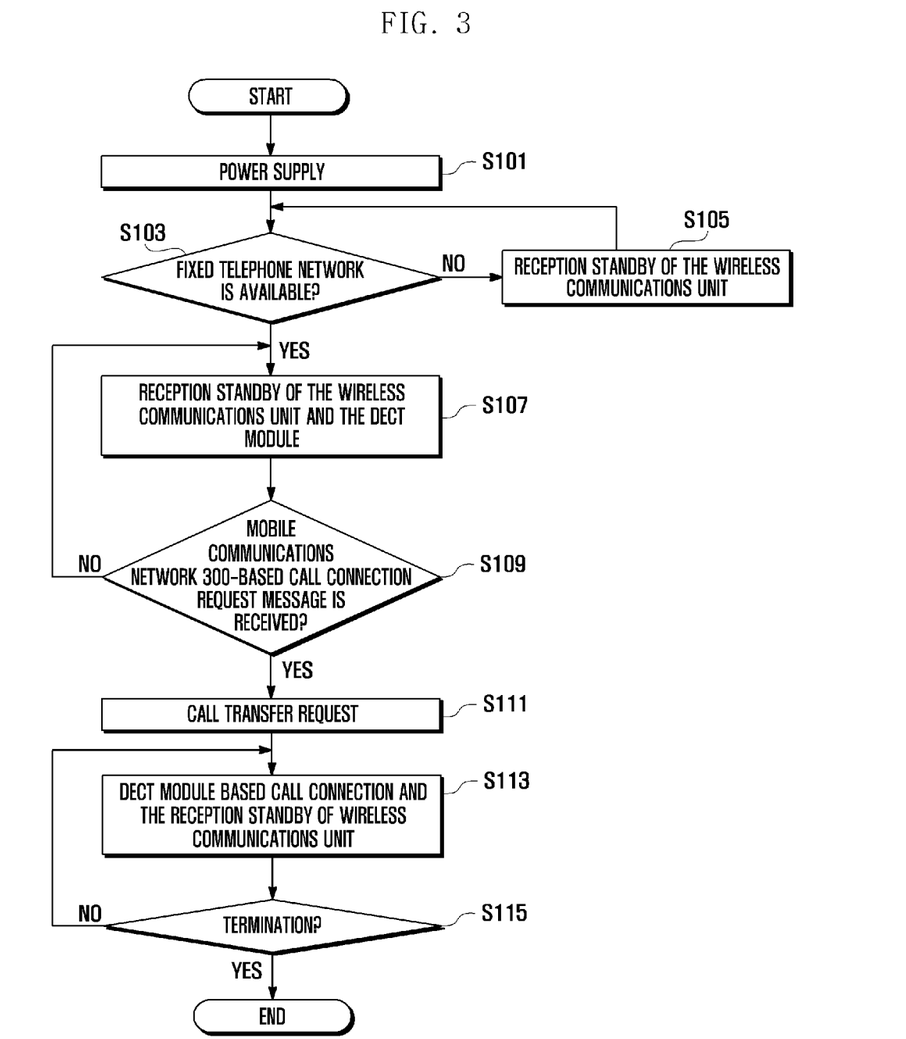
FIG. 3 is a flowchart illustrating an operation of a portable device according to an exemplary embodiment of the present invention.

FIG. 3 is a flowchart for illustrating a method for saving the power of a portable device according to an exemplary embodiment of the present invention.

Referring to FIGS. 1 and 3, the portable device 100 can be supplied with a power under the control of the input unit 120 by user (e.g., a turn on command) (S101). The portable device 100 supplied with power can initialize each element of the device and can maintain a specific element in a standby state according to a preset schedule. For instance, the portable device 100 may activate the wireless communications unit 110 when the power is supplied, and search the base station to form a call channel through the wireless communications unit 110. The portable device 100 can operate to maintain the reception standby state capable of forming the call channel with the searched base station.

The portable device 100 can operate to activate the display unit 140 and support the screen output according to various user function(s). Particularly, the portable device 100 can check whether the fixed telephone network 400 is available (S103).

That is, the portable device 100 can activate the DECT module 170 and can check whether the fixed telephone network 400 can be used based on the DECT module 170. When the portable device 100 is positioned in a location in which the fixed telephone network 400 is not available, the portable device 100 operates only the reception standby mode of the wireless communications unit 110, and can control the user functional support according to other user input (S105). That is, the fixed communication (telephone) network module may be powered-off.

When the fixed telephone network 400 is available at S103, e.g., the DECT module 170 can be used for the signal transmission and reception, the portable device 100 can operate to maintain both the wireless communications unit 110 and the DECT module 170 in a reception standby state (S107).

At this time, the portable device 100 performs a process of registration in the fixed telephone network 400 through the DECT module 170. That is, the information that is allocated in the service subscription, e.g., the telephone number can be transmitted to the fixed telephone network 400 through the DECT module 170 so that the portable device 100 may use the fixed telephone network 400. At this time, the DECT module 170 in the portable device 100 can communicate with the fixed telephone network 400 and a communication channel based on the wire gateway 200 or the DECT base station may be established.

The portable device 100 checks whether the mobile communications network 300-based call connection request message is received (S109). When the call connection request message is not received, processing returns to S107 and performs the next process repetitively.

In the meantime, in case of receiving a call connection request message based on the mobile communications network 300 at S109, the portable device 100 can perform the call transfer request (S111).

That is, at step 111 (S111), the portable device 100 makes a call transfer request message for a call connection request message, received through the mobile communications network 300, to be sent through the fixed telephone network 400. In this case, the portable device 100 can include a telephone number that can connect a call based on the fixed telephone network 400 in the call transfer require-message, and transmit the call transfer require message to the mobile communications network 300. And then, the mobile communication network 300 can forward the call connection request message to the fixed telephone network 400 with reference to the telephone number included in the call transfer request message received from the portable device 100. The fixed telephone network 400 operates to form a call channel with the DECT module 170 included in the portable device 100 based on the call connection request message and the telephone number received from the mobile communications network 300. After transmitting the call transfer request message to the mobile communications network 300 at step S111, the portable device 100 can perform the call connection based on the DECT module 170 (S113).

And the portable device 100 operates to maintain the reception standby mode of the wireless communications unit 110 at step S113. That is, the portable device 100 maintains the power supplied to the wireless communications unit 110 as a low power state. Thereafter, the portable device 100 checks the termination (S115) of the call. When the call is maintained, processing returns to step S113 and the next process can be repetitively performed. In the meantime, when the call connection request message is received based on the fixed telephone network 400, the portable device 100 can perform the call connection based on the DECT module 170.

As described above, the portable device 100 according to an exemplary embodiment of the present invention can minimize the power consumption of the device by performing only the call connection using the DECT module 170 having relatively small power consumption while not performing the call connection using the wireless communication unit 110 when the portable device 100 exists in the location in which the fixed telephone network 400 is available.

Here, step S109 and step S111 can be omitted according to the service policy of the mobile communications systems and the fixed telephone system.

In more detail, when the mobile communication network 300 obtains the information of fixed telephone network 400 availability state for the portable device 100 and the information of fixed telephone network 400 availability registration of the portable device 100, the mobile communication systems, constituting the mobile communication network 300, can directly send the call connection request message to the fixed telephone network 400 while not transmitting the call connection request message to the portable device 100.

In this case, the portable device 100 may not receive the call connection request message from the mobile communications network 300. Accordingly, the message transmission for the call transfer request may not be performed. This process is illustrated in detail with reference to the drawing.

Figure 4:
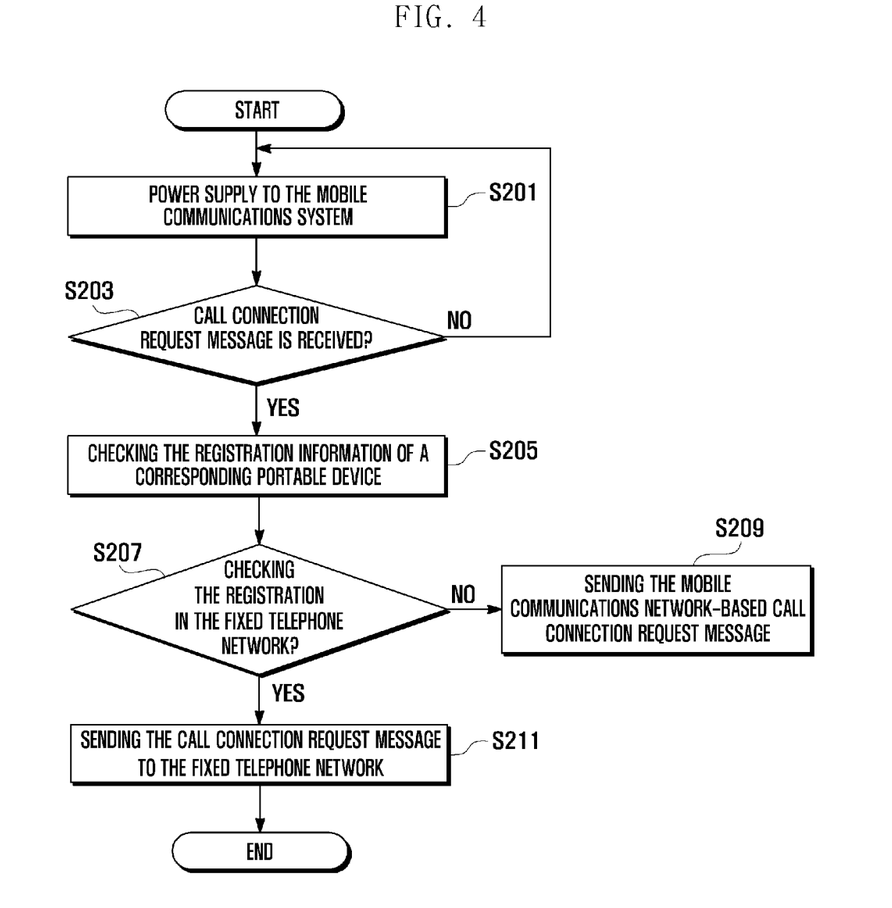
FIG. 4 is a flowchart illustrating an operation of a mobile communication system according to another exemplary embodiment of the present invention.

FIG. 4 is a flowchart illustrating an operation of a mobile communication system during the systems operation for saving a power of a portable device according to another exemplary embodiment of the present invention. The mobile communications systems can be various system configurations constituting the mobile communication network 300, as previously discussed.

Referring to FIGS. 1 and 4, the mobile communications system initializes each element of the system when power is supplied to the system (S201), and enters a standby state to support mobile communication service(s) (S203).

Particularly, at step 203, the mobile communication system can check whether the mobile communication network 300-based call connection request message to be transmitted to a specific portable device 100 is received. When a separate message receipt does not exist, the mobile communication system returns to step 201 and can processing maintains the system power supply and the system in a standby state. When the call connection request message is received at step 203, the mobile communication system checks the registration information of a corresponding portable device 100 (S205), and checks whether the portable device 100 is registered in the fixed telephone network 400 (S207).

That is, at step 207, the mobile communication system checks whether the portable device 100 can use the mobile communication network 300 or can use the fixed telephone network 400. When the portable device 100, to receive the call connection request message, is not registered in the fixed telephone network 400, or is unable to use the fixed telephone network 400 at step 207, the mobile communication system can operate to send the call connection request message based on the mobile communication network 300 (S209).

However, when the portable device 100 is registered in the fixed telephone network 400 at step 207, the mobile communication system can send the call connection request message to the fixed telephone network 400 (S211). In this case, the mobile communication system obtains the information of a telephone number available for the fixed telephone network 400 that the portable device 100 joins and can send this telephone number to the fixed telephone network 400 with the call connection request message.

To do this, the mobile communication system previously obtains the information of a phone number of the portable device 100 available to the fixed telephone network 400 through the portable device 100 or the fixed telephone system, and information regarding whether the portable device 100 can use the fixed telephone network 400.

As described above, when the portable device 100, using the fixed telephone network 400, is positioned in the coverage area of the fixed telephone network 400, the mobile communication system of the present invention sends the mobile communication network 300-based call connection request message, which is to be sent to the mobile communication network 300 support communication module of a corresponding portable device 100, to the fixed telephone network 400 support communications module of the portable device 100, so that the portable terminal can perform a fixed telephone network 400-based call connection.

Accordingly, when the portable device 100 exists in a location where the fixed telephone network 400-based communication is available, the portable terminal maintains the power supply state of the wireless communications unit 110 in a low power state, and can perform the call connection based on the DECT module 170, which has a relatively small power consumption in comparison with the wireless communications unit 110, so that the power used for the call connection can be minimized.

Figure 5:
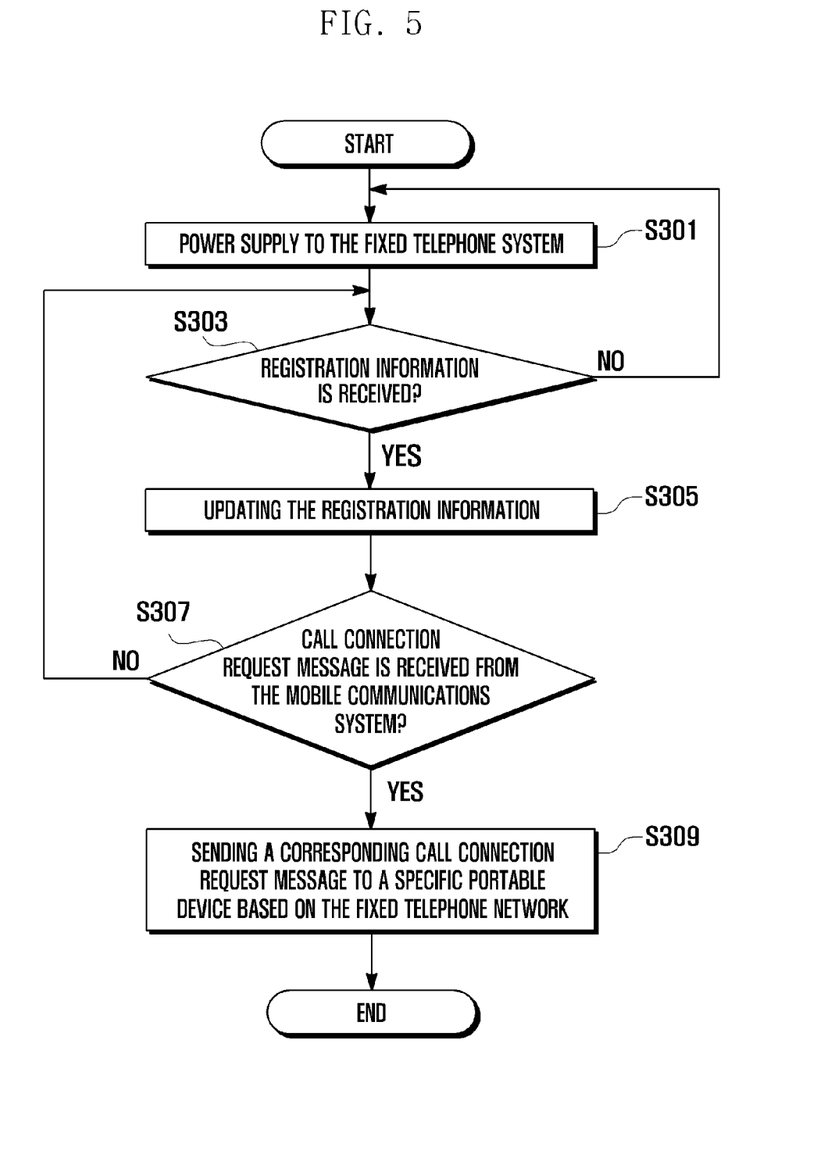
FIG. 5 is a flowchart illustrating an operation of a fixed telephone system according to another exemplary embodiment of the present invention.

FIG. 5 is a flowchart illustrating an operation of a fixed telephone system in the process of transmitting the call connection request message based on the mobile communication system according to an exemplary embodiment of the present invention. As would be recognized, the fixed telephone system can refer to various different types of system configurations and/or elements constituting the fixed telephone network 400.

Referring to FIG. 5, the fixed telephone system initializes each element of the telephone system when a power is supplied to the telephone system (S301), and checks whether the registration information of a specific portable device 100 is received (S303). When separate registration information is not received at step 303, the processing returns to step 301 and the next process can be repetitively performed.

However, when a specific portable device 100 enters a range where the fixed telephone network 400 is available, and transmits a necessary signal so as to activate the DECT module 170 and register in the fixed telephone network 400, the fixed telephone system receives a corresponding signal and can check the registration information of the portable device 100 based on the received signal.

In addition, the fixed telephone system may update the registration information (S305). This registration information update procedure can include information regarding the position of the portable device 100 within an area of coverage of the fixed telephone network 400. The fixed telephone system can share such information with the mobile communications system, or can send it when the mobile communication system requests corresponding information. Furthermore, the fixed telephone system may share the information of the fixed telephone network 400 available telephone number of a corresponding portable device 100 with the mobile communication system, or can send the information when the information is requested. Then, the fixed telephone system can check whether the call connection request message is received from the mobile communication system (S307). When a separate message is not received at step 307, processing returns to step 303 and the fixed telephone system can repetitively perform the next process.

When the call connection request message is received from the mobile communications systems at step 307, the fixed telephone system can control to send a corresponding call connection request message to a specific portable device 100 based on the fixed telephone network 400 (S309).

At this time, the fixed telephone system also receives the information of the fixed telephone network 400 available telephone number of a specific portable device 100 when receiving the call connection request message from the mobile communication system, and operates to make the call connection request message to be sent to a specific portable device 100 based on the received information. To do this, the fixed telephone system can obtain the information of mobile communication network 300 available phone number of the portable device 100 from the portable device 100, or from the mobile communication systems when the information is provided by the mobile communications system constituting the mobile communications network 300.

As described above, the method for saving a power according to an exemplary embodiment of the present invention, the system and the portable device can support the transfer of a call connection request message sent to the wireless communications unit 110 prepared in the portable device 100 and form the call through the DECT module 170.

In more detail, the mobile communication system obtains the information of fixed telephone network 400 available phone number of the portable device 100. When the portable device 100 obtains the information that the portable device 100 is positioned in the range where the fixed telephone network 400 is available, the mobile communications system can send the call connection request message, which is to be sent to the portable device 100, to the fixed telephone network 400.

Accordingly, the portable device 100 receives the call connection request message, which is to be received through the wireless communication unit 110, based on the DECT module 170 and can form a call based on the fixed telephone network 400. And the portable device 100 can minimize the power consumption by maintaining the wireless communication unit 110 in a low power state.

Moreover, in the method for saving a power according to an exemplary embodiment of the present invention, when the portable device 100 exists in a location in which the fixed telephone network 400 is available, the call connection request message sent through the wireless communication unit 110 is requested to be transferred so as to be sent through the fixed telephone network 400. As a result, the call connection request message that is sent through the wireless communication unit 110 is received based on the fixed telephone network 400 support communication module, and a fixed telephone network 400-based call channel can be formed.

The above-described methods according to the present invention can be realized in the controller in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in the controller in such software using a general purpose computer, or a special processor or in programmable or dedicated hardware, such as an ASIC or FPGA. As would be understood in the art, the controller (represented by a computer, a processor or a programmable hardware) includes memory components, e.g., RAM, ROM, Flash, etc. that may store or receive software or computer code that when accessed and executed by the computer, processor or hardware to implement the processing methods described herein. The code when loaded into a general purpose computer transforms the general purpose computer into a special purpose computer that may in part be dedicated to the processing shown herein. In addition, the computer, processor or dedicated hardware may be composed of at least one of a single processor, a multi-processor, and a multi-core processor.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for performing communications in a portable device having a first module adapted for communications over a mobile communication network and a second module adapted for communications over a fixed telephone network, the method comprising:
    determining whether the portable device is located in a coverage area associated with the fixed telephone network by a predetermined period;
    activating the second module when the portable device is located in the coverage area;
    receiving, by the first module, a call connection request message from the mobile communication network while the portable device is: (i) registered with both the mobile communication network and the fixed telephone network, and (ii) located in the coverage area;
    refraining, by the first module, from conducting a call associated with the call connection request message;
    transmitting, by the first module, to the mobile communication network a call transfer message requesting the call connection request message to be transferred onto the second module; and
    when the call connection request message is received at the second module over the fixed telephone network, establishing, by the second module, the call over the fixed telephone network.

2. The method of claim 1, wherein the call transfer message includes a telephone number assigned to the portable device in the fixed telephone network.

3. The method of claim 1, wherein the second module is connected to a Digital Enhanced Cordless Telecommunications (DECT) base station and the coverage area associated with the fixed telephone network is the coverage area of the DECT base station.

4. The method of claim 1, further comprising, when the call connection request message is received at the second module over the fixed telephone network, outputting an indication that the call connection request message corresponds to another call connection request message previously received at the first module over the mobile communication network.

5. The method of claim 1, further comprising maintaining the first module in a low power state after the call transfer message is transmitted.

6. A system for performing communications, comprising:
    a mobile communication network;
    a fixed telephone network; and
    a portable device, including a first module adapted for communications over the mobile communication network and a second module adapted for communications over the fixed telephone network, the portable device being configured to:
    determine whether the portable device is located in a coverage area associated with the fixed telephone network by a predetermined period;
    activate the second module when the portable device is located in the coverage area;
    receive, by the first module, a call connection request message from the mobile communication network while the portable device is: (i) registered with both the mobile communication network and the fixed telephone network and (ii) located in the coverage area;
    refrain, by the first module, from conducting a call associated with the call connection request message;
    transmit, by the first module, to the mobile communication network a call transfer message requesting the call connection request message to be transferred onto the second module; and
    when the call connection request message is received at the second module over the fixed telephone network, establish by the second module the call over the fixed telephone network.

7. The system of claim 6, wherein when the call connection request message is received at the second module over the fixed telephone network, the portable device is further configured to output an indication that the call connection request message corresponds to another call connection request message previously received at the first module over the mobile communication network.

8. The system of claim 6, wherein the call transfer message includes a telephone number assigned to the portable device in the fixed telephone network.

9. The system of claim 6, wherein the portable device is further configured to maintain the first module in a low power state.

10. An electronic device comprising a first module adapted for communications over a mobile communication network, a second module adapted for communications over a fixed telephone network, and a processor configured to:
- determine whether the electronic device is located in a coverage area associated with the fixed telephone network by a predetermined period;
- activate the second module when the electronic device is located in the coverage area:
- control the first module to receive a call connection request message from the mobile communication network while the device is: (i) registered with both the mobile communication network and the fixed telephone network, and (ii) located in the coverage area;
- control the first module to refrain from conducting a call associated with the call connection request message;
- control the first module to transmit to the mobile communication network a call transfer message requesting the call connection request message to be transferred onto the second module; and
- when the call connection request message is received at the second module over the fixed telephone network, control the second module to establish the call over the fixed telephone network.

11. The electronic device of claim 10, wherein the call transfer message includes a telephone number assigned to the electronic device in the fixed telephone network.

12. The electronic device of claim 10, wherein the second module is connected to a Digital Enhanced Cordless Telecommunications (DECT) base station and the coverage area associated with the fixed telephone network is the coverage area of the DECT base station.

13. The electronic device of claim 10, wherein when the call connection request message is received at the second module over the fixed telephone network, the processor is further configured to output an indication that the call connection request message corresponds to another call connection request message previously received at the first module over the mobile communication network.

14. The electronic device of claim 10, wherein the processor is further configured to maintain the first module in a low power state after the call transfer message is transmitted.

15. An electronic device comprising a first module adapted for communications over a mobile communication network, a second module adapted for communications over a fixed telephone network, and a processor configured to:
- determine whether the electronic device is located in a coverage area associated with the fixed telephone network by a predetermined period;
- activate the second module when the electronic device is located in the coverage area;
- control the first module to receive a first call connection request message at the first module, the first call connection request message being received over the mobile communication network while the electronic device is located in the coverage area;
- control the first module to transmit, to the mobile communication network, a call transfer message requesting the call connection request message to be transferred onto the second module;
- control the second module to receive a second call connection request message, the second call connection request message being received over the fixed telephone network, and the second call connection request message being generated based on information contained in the call transfer message;
- output an indication that the second call connection request message is associated with the first call connection request message; and
- control the second module to establish a call in response to the second call connection request message.

16. The electronic device of claim 15, wherein the call transfer message includes a telephone number assigned to the electronic device in the fixed telephone network.

17. The electronic device of claim 15, wherein the second module is connected to a Digital Enhanced Cordless Telecommunications (DECT) base station and the coverage area associated with the fixed telephone network is the coverage area of the DECT base station.

* * * * *